(12) United States Patent
Matsuo

(10) Patent No.: US 8,189,269 B2
(45) Date of Patent: May 29, 2012

(54) ZOOM OPTICAL SYSTEM, OPTICAL APPARATUS EQUIPPED THEREWITH AND METHOD FOR MANUFACTURING THE ZOOM OPTICAL SYSTEM

(75) Inventor: Taku Matsuo, Kawasaki (JP)

(73) Assignee: Nikon Corporation, Tokyo (JP)

( * ) Notice: Subject to any disclaimer, the term of this patent is extended or adjusted under 35 U.S.C. 154(b) by 145 days.

(21) Appl. No.: 12/832,679

(22) Filed: Jul. 8, 2010

(65) Prior Publication Data
US 2011/0007403 A1 Jan. 13, 2011

(30) Foreign Application Priority Data
Jul. 9, 2009 (JP) ................................. 2009-162681

(51) Int. Cl.
*G02B 15/14* (2006.01)
(52) U.S. Cl. ....................................... 359/676; 359/684
(58) Field of Classification Search .................. 359/676, 359/684, 685, 763, 764
See application file for complete search history.

(56) References Cited

U.S. PATENT DOCUMENTS
7,835,089 B2 * 11/2010 Arai ............................... 359/783

FOREIGN PATENT DOCUMENTS
JP 2003-344768 A 12/2003
* cited by examiner

*Primary Examiner* — Alicia M Harrington
(74) *Attorney, Agent, or Firm* — Miles & Stockbridge P.C.

(57) ABSTRACT

Composing a zoom optical system ZL, in order from an object side, a first lens group G1 having positive refractive power, a second lens group G2 having negative refractive power, a third lens group G3 having positive refractive power, a fourth lens group G4 having positive refractive power, and a fifth lens group G5 having negative refractive power; and disposing each lens group with satisfying a given conditional expression (1); thereby providing a zoom optical system ZL capable of suppressing variation in aberrations upon zooming and carrying out excellent vibration reduction, an optical apparatus equipped therewith, and a method for manufacturing the zoom optical system.

18 Claims, 11 Drawing Sheets

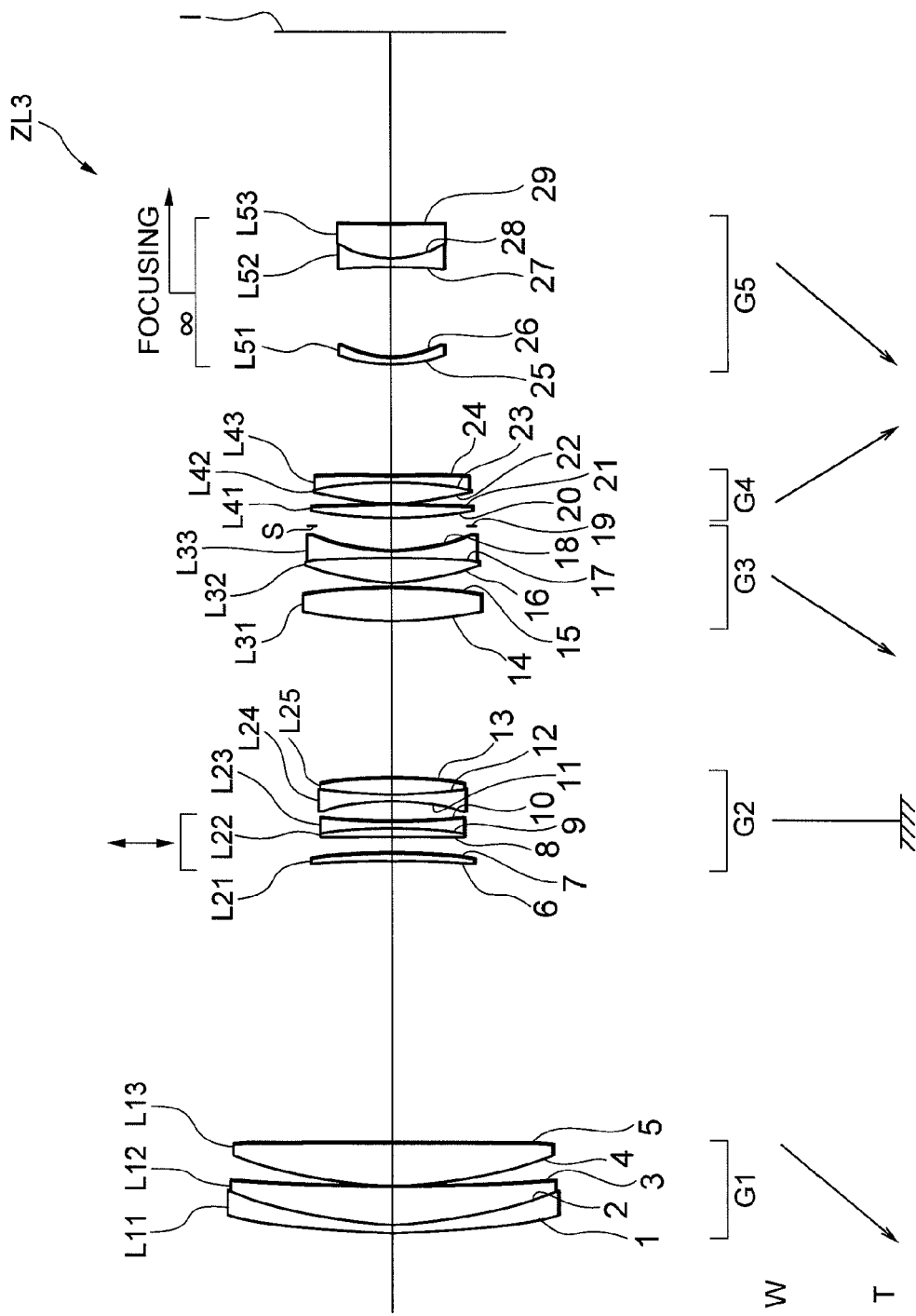

ZOOM OPTICAL SYSTEM, OPTICAL APPARATUS EQUIPPED THEREWITH AND METHOD FOR MANUFACTURING THE ZOOM OPTICAL SYSTEM

The disclosure of the following priority application is herein incorporated by reference:

Japanese Patent Application No. 2009-162681 filed on Jul. 9, 2009.

BACKGROUND OF THE INVENTION

1. Field of the Invention

The present invention relates to a zoom optical system, an optical apparatus equipped with the zoom optical system, and a method for manufacturing the zoom optical system.

2. Related Background Art

There have been proposed zoom optical systems suitable for a film camera, an electronic still camera, a video camera, and the like disclosed in such as a Japanese Patent Application Laid-Open No. 2003-344768. However, the conventional zoom optical system has had a problem that variation in aberrations upon zooming is large.

SUMMARY OF THE INVENTION

The present invention is made in view of the above described problem, and has an object to provide a zoom optical system capable of coping with the problem of variation in aberrations upon zooming and obtaining excellent optical performance, an optical apparatus equipped with the zoom optical system, and a method for manufacturing the zoom optical system.

According to a first aspect of the present invention, there is provided a zoom optical system comprising, in order from an object side: a first lens group having positive refractive power; a second lens group having negative refractive power; a third lens group having positive refractive power; a fourth lens group having positive refractive power; and a fifth lens group having negative refractive power; the following conditional expression (1) being satisfied:

$$0.20 < f3/fw < 0.70 \quad (1)$$

where f3 denotes a focal length of the third lens group, and fw denotes a focal length of the zoom optical system in the wide-angle end state.

In the first aspect of the present invention, it is preferable that the second lens group is fixed upon zooming from a wide-angle end state to a telephoto end state.

In the first aspect of the present invention, it is preferable that at least a portion of the second lens group is movable in a direction including a component substantially perpendicular to an optical axis.

In the first aspect of the present invention, it is preferable that the following conditional expression (2) is satisfied:

$$1.00 < f1/fw < 1.43 \quad (2)$$

where f1 denotes a focal length of the first lens group.

In the first aspect of the present invention, it is preferable that the following conditional expression (3) is satisfied:

$$0.20 < (-f2)/fw < 0.50 \quad (3)$$

where f2 denotes a focal length of the second lens group.

In the first aspect of the present invention, it is preferable that at least a portion of the fifth lens group is movable along an optical axis upon focusing.

In the first aspect of the present invention, it is preferable that the following conditional expression (4) is satisfied:

$$2.10 < f1/(-f2) < 3.50 \quad (4)$$

where f1 denotes a focal length of the first lens group, f2 denotes a focal length of the second lens group.

In the first aspect of the present invention, it is preferable that the following conditional expression (5) is satisfied:

$$0.40 < (-f5)/f3 < 0.70 \quad (5)$$

where f5 denotes a focal length of the fifth lens group.

In the first aspect of the present invention, it is preferable that the second lens group includes, in order from the object side, a positive meniscus lens having a convex surface facing an image side, and a cemented lens.

In the first aspect of the present invention, it is preferable that the fifth lens group includes, in order from the object side, a negative meniscus lens having a concave surface facing an image side, and a cemented lens.

In the first aspect of the present invention, it is preferable that an aperture stop is disposed to an image side of the third lens group.

In the first aspect of the present invention, it is preferable that an aperture stop is moved in a body with the third lens group upon zooming.

According to a second aspect of the present invention, there is provided an optical apparatus equipped with the first aspect.

According to a third aspect of the present invention, there is provided a method for manufacturing a zoom optical system including a first lens group having positive refractive power, a second lens group having negative refractive power, a third lens group having positive refractive power, a fourth lens group having positive refractive power, and a fifth lens group having negative refractive power, the method comprising steps of: providing the first lens group, the second lens group, the third lens group, the fourth lens group, and the fifth lens group; and disposing each lens group with satisfying the following conditional expression (1):

$$0.20 < f3/fw < 0.70 \quad (1)$$

where f3 denotes a focal length of the third lens group, and fw denotes a focal length of the zoom optical system in a wide-angle end state.

In the third aspect of the present invention, the third aspect preferably includes a step of: fixing the second lens group upon zooming from the wide-angle end state to a telephoto end state.

In the third aspect of the present invention, the third aspect preferably includes a step of: disposing at least a portion of the second lens group movable in a direction including a component substantially perpendicular to an optical axis.

In the third aspect of the present invention, the third aspect preferably includes a step of: disposing each lens group with satisfying the following conditional expression (2):

$$1.00 < f1/fw < 1.43 \quad (2)$$

where f1 denotes a focal length of the first lens group.

In the third aspect of the present invention, the third aspect preferably includes a step of: disposing each lens group with satisfying the following conditional expression (3):

$$0.20 < (-f2)/fw < 0.50 \quad (3)$$

where f2 denotes a focal length of the second lens group.

With constructing the zoom optical system, an optical apparatus equipped with the zoom optical system, and a method for manufacturing the zoom optical system as described above, it becomes possible to obtain excellent optical performance capable of coping with variation in aberrations upon zooming.

BRIEF DESCRIPTION OF THE DRAWINGS

FIGS. 2A, 2B, and 2C are graphs showing various aberrations of the zoom optical system according to Example 1 focusing on infinity, in which FIG. 2A is in a wide-angle end state, FIG. 2B is in an intermediate focal length state, and FIG. 2C is in a telephoto end state.

FIGS. 3A, 3B and 3C are graphs showing coma upon correcting rotational camera shake of 0.2 degrees of the zoom optical system according to Example 1, in which FIG. 3A is in the wide-angle end state, FIG. 3B is in the intermediate focal length state, and FIG. 3C is in the telephoto end state.

FIGS. 5A, 5B, and 5C are graphs showing various aberrations of the zoom optical system according to Example 2 focusing on infinity, in which FIG. 5A is in a wide-angle end state, FIG. 5B is in an intermediate focal length state, and FIG. 5C is in a telephoto end state.

FIGS. 6A, 6B and 6C are graphs showing coma upon correcting rotational camera shake of 0.2 degrees of the zoom optical system according to Example 2, in which FIG. 6A is in the wide-angle end state, FIG. 6B is in the intermediate focal length state, and FIG. 6C is in the telephoto end state.

FIG. 7 is a sectional view showing a lens configuration of a zoom optical system according to Example 3.

FIGS. 8A, 8B and 8C are graphs showing various aberrations of the zoom optical system according to Example 3 focusing on infinity, in which FIG. 8A is in a wide-angle end state, FIG. 8B is in an intermediate focal length state, and FIG. 8C is in a telephoto end state.

FIGS. 9A, 9B and 9C are graphs showing coma upon correcting rotational camera shake of 0.2 degrees of the zoom optical system according to Example 3, in which FIG. 9A is in the wide-angle end state, FIG. 9B is in the intermediate focal length state, and FIG. 9C is in the telephoto end state.

DESCRIPTION OF THE MOST PREFERRED EMBODIMENT

Figure 1:
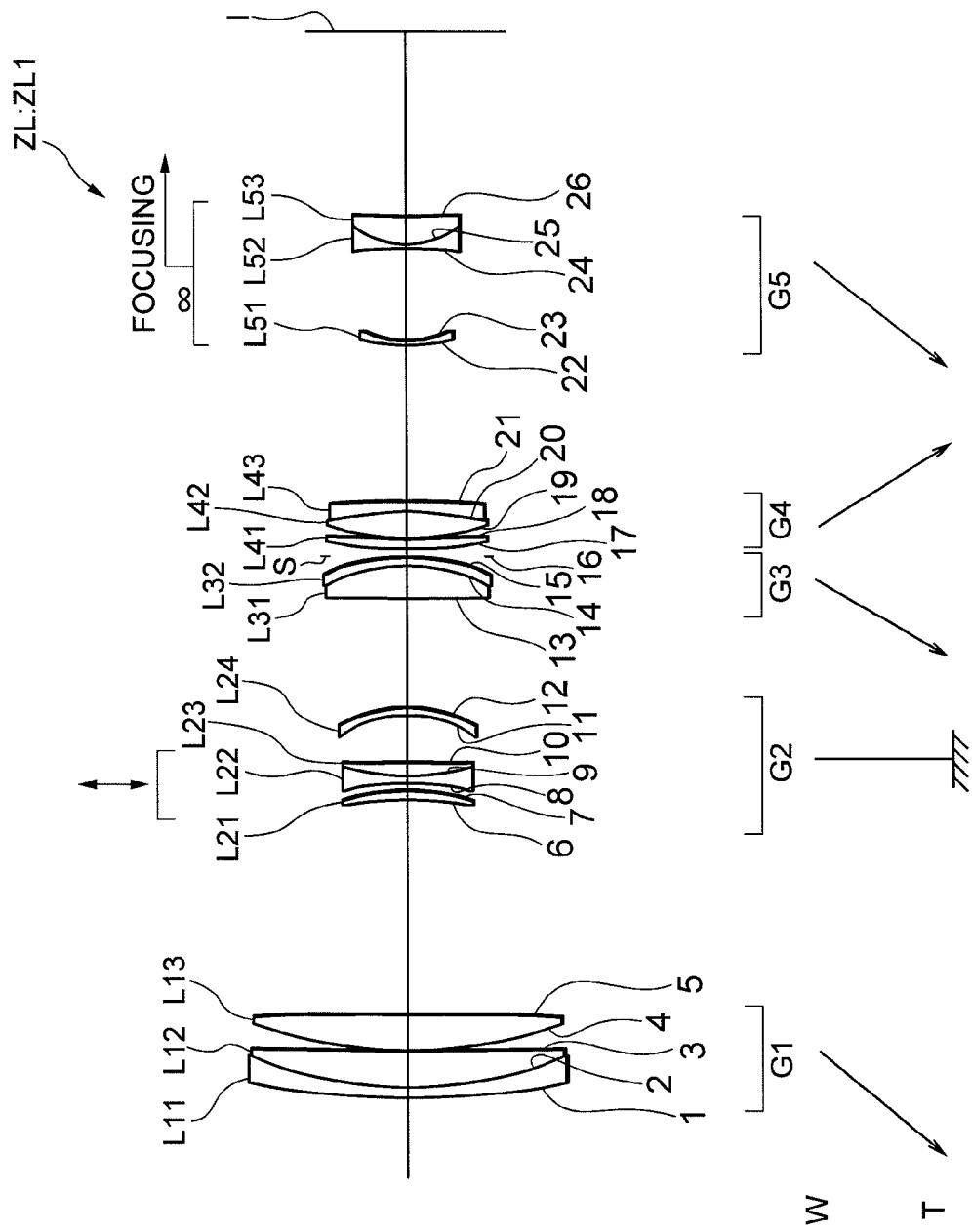
FIG. 1 is a sectional view showing a lens configuration of a zoom optical system according to Example 1.

A preferred embodiment according to the present application is explained with reference to accompanying drawings. As shown in FIG. 1, a zoom optical system ZL according to the present embodiment is composed of, in order from an object side, a first lens group G1 having positive refractive power, a second lens group G2 having negative refractive power, a third lens group G3 having positive refractive power, a fourth lens group G4 having positive refractive power, and a fifth lens group G5 having negative refractive power. The second lens group G2 is preferably fixed upon zooming from a wide-angle end state to a telephoto end state. With this construction, it becomes possible to simplify a zooming mechanism and to make the lens barrel compact.

In a zoom lens system ZL according to the present embodiment, the following conditional expression (1) is preferably satisfied:

$$0.20 < f3/fw < 0.70 \quad (1)$$

where f3 denotes a focal length of the third lens group G3, and fw denotes a focal length of a wide-angle end state.

Conditional expression (1) defines an appropriate range of the focal length of the third lens group G3 with respect to the focal length in the wide-angle end state. When the ratio f3/fw is equal to or exceeds the upper limit of conditional expression (1), power of the third lens group G3 becomes weak, so that the total length of the lens barrel becomes large. Moreover, it becomes difficult to correct curvature of field, so that it is undesirable. In order to secure the effect of the present embodiment, it is preferable to set the upper limit of conditional expression (1) to 0.63. On the other hand, when the ratio f3/fw is equal to or falls below the lower limit of conditional expression (1), it becomes difficult to correct spherical aberration, so that it is undesirable. In order to secure the effect of the present embodiment, it is preferable to set the lower limit of conditional expression (1) to 0.40.

A zoom lens system ZL according to the present embodiment may have a vibration reduction lens that corrects an image blur caused by a camera shake by moving a lens group or a portion of a lens group in a direction including a component substantially perpendicular to the optical axis or by making a rotational movement (rocking movement) in a plane including the optical axis. In particular, at least a portion of the second lens group G2 is preferably moved in a direction including a component substantially perpendicular to the optical axis as a vibration reduction lens group. With this construction, it becomes possible to carry out vibration reduction by a compact, small diameter lens group, and to make the vibration reduction unit and the lens barrel compact.

In a zoom lens system ZL according to the present embodiment, the following conditional expression (2) is preferably satisfied:

$$1.00 < f1/fw < 1.43 \quad (2)$$

where f1 denotes a focal length of the first lens group.

Conditional expression (2) defines an appropriate range of the focal length of the first lens group G1 with respect to the focal length in the wide-angle end state. When the ratio f1/fw is equal to or exceeds the upper limit of conditional expression (2), power of the first lens group G1 becomes weak, and the total length becomes large, so that the second lens group becomes large. Accordingly, spherical aberration is generated to become difficult to be corrected, so that it is undesirable. In order to secure the effect of the present embodiment, it is preferable to set the upper limit of conditional expression (2) to 1.20. On the other hand, when the ratio f1/fw is equal to or falls below the lower limit of conditional expression (2), it becomes difficult to correct spherical aberration and curvature of field, so that it is undesirable. In order to secure the effect of the present embodiment, it is preferable to set the lower limit of conditional expression (2) to 1.10.

In a zoom lens system ZL according to the present embodiment, the following conditional expression (3) is preferably satisfied:

$$0.20 < (-f2)/fw < 0.50 \quad (3)$$

where f2 denotes a focal length of the second lens group G2.

Conditional expression (3) defines an appropriate range of the focal length of the second lens group G2 with respect to the focal length in the wide-angle end state. When the ratio (−f2)/fw is equal to or exceeds the upper limit of conditional expression (3), power of the second lens group G2 becomes weak, so that it becomes difficult to compensate distortion generated by the first lens group G1. Moreover, it becomes difficult to secure desired speed and to make the second lens group G2 compact, so that it is undesirable. In order to secure the effect of the present embodiment, it is preferable to set the upper limit of conditional expression (3) to 0.48. On the other hand, when the ratio (−f2)/fw is equal to or falls below the lower limit of conditional expression (3), power of the second lens group G2, which is the vibration reduction lens group, becomes excessively strong, so that it becomes difficult to correct coma and longitudinal chromatic aberration. Moreover, variation in image inclination upon vibration reduction becomes large, so that it is undesirable. In order to secure the effect of the present embodiment, it is preferable to set the lower limit of conditional expression (3) to 0.30.

In a zoom lens system ZL according to the present embodiment, in order to vary focusing from infinity to a close object, a portion of a lens group, a single lens group, or a plurality of lens groups may be moved along the optical axis as a focusing lens group. In this case, the focusing lens group can be used for auto focus, and suitable for being driven by a motor such as an ultrasonic motor. It is particularly preferable that at least a portion of the fifth lens group G5 is moved as the focusing lens group. With this construction, and with moving the fifth lens group G5 having the smallest diameter, it becomes possible to make the lens barrel compact and to carry out fast focusing.

In a zoom lens system ZL according to the present embodiment, the following conditional expression (4) is preferably satisfied:

$$2.10 < f1/(-f2) < 3.50 \quad (4)$$

where f1 denotes a focal length of the first lens group G1, and f2 denotes a focal length of the second lens group G2.

Conditional expression (4) defines an appropriate range of the focal length of the first lens group G1 with respect to the focal length of the second lens group G2. When the ratio f1/(−f2) is equal to or exceeds the upper limit of conditional expression (4), it becomes difficult to make the total length of the lens barrel and the second lens group G2 compact. Moreover, power of the first lens group G1 becomes weak to generate spherical aberration, so that it is undesirable. In order to secure the effect of the present embodiment, it is preferable to set the upper limit of conditional expression (4) to 3.20. On the other hand, when the ratio f1/(−f2) is equal to or falls below the lower limit of conditional expression (4), it becomes difficult to correct distortion and lateral chromatic aberration, so that it is undesirable. In order to secure the effect of the present embodiment, it is preferable to set the lower limit of conditional expression (4) to 2.50.

In a zoom lens system ZL according to the present embodiment, the following conditional expression (5) is preferably satisfied:

$$0.40 < (-f5)/f3 < 0.70 \quad (5)$$

where f5 denotes a focal length of the fifth lens group G5.

Conditional expression (5) defines an appropriate range of the focal length of the fifth lens group G5 with respect to the focal length of the third lens group G3. When the ratio (−f5)/f3 is equal to or exceeds the upper limit of conditional expression (5), moving amount of the fifth lens group G5 upon focusing becomes large, and the total length of the lens barrel becomes large, so that it is undesirable. In order to secure the effect of the present embodiment, it is preferable to set the upper limit of conditional expression (5) to 0.66. On the other hand, when the ratio (−f5)/f3 is equal to or falls below the lower limit of conditional expression (5), power of the fifth lens group G5, which is the focusing lens group, becomes strong, and variation in curvature of the field upon focusing becomes large, so that it is undesirable. In order to secure the effect of the present embodiment, it is preferable to set the lower limit of conditional expression (5) to 0.50.

Figure 10:
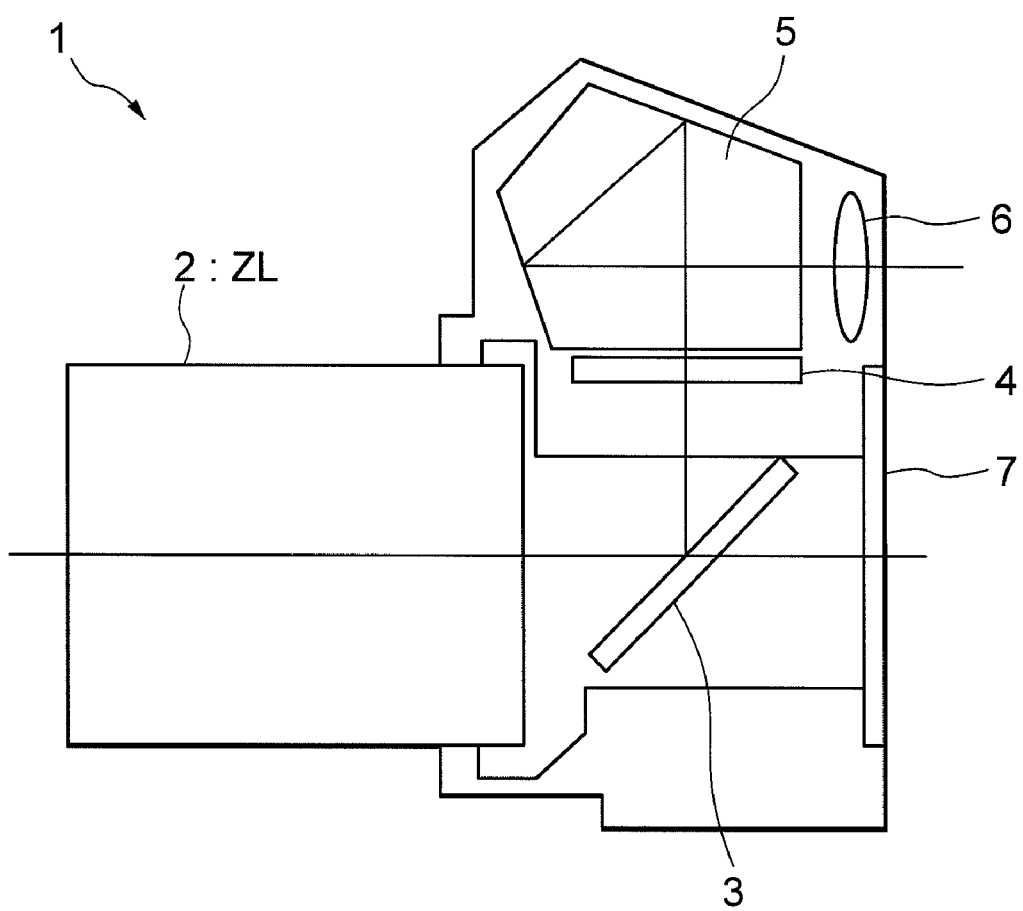
FIG. 10 is a sectional view showing a single-lens reflex digital camera equipped with the zoom optical system according to the present embodiment.

In FIG. 10, a sectional view showing a single-lens reflex digital camera (hereinafter simply called as a camera) 1 as an optical apparatus equipped with the zoom optical system ZL described above is shown. In the camera 1, light emitted from an unillustrated object is converged by a zoom optical system 2 (zoom optical system ZL), reflected by a quick return mirror 3, and focused on a focusing screen 4. The light focused on the focusing screen 4 is reflected a plurality of times in a pentagonal roof prism 5, and led to an eyepiece 6. Accordingly, a photographer can observe the object (subject to be photographed) image as an erected image through the eyepiece 6.

When the photographer presses an unillustrated release button all the way down, the quick return mirror 3 is retracted from the optical path, the light from the unillustrated object (subject to be photographed) forms an object image on an imaging device 7. Accordingly, the light emitted from the object (subject to be photographed) and converged by the zoom optical system 2 is captured by the imaging device 7, and stored in an unillustrated memory as a photographed image of the object (subject to be photographed). In this manner, the photographer can take a picture of an object (subject to be photographed) by the camera 1. Incidentally, the camera 1 shown in FIG. 10 may be constructed to removably hold the zoom optical system ZL, or may be constructed in a body with the zoom optical system ZL. The camera 1 may be a so-called single-lens reflex camera, or a compact camera which does not include a quick return mirror or the like.

Figure 11:
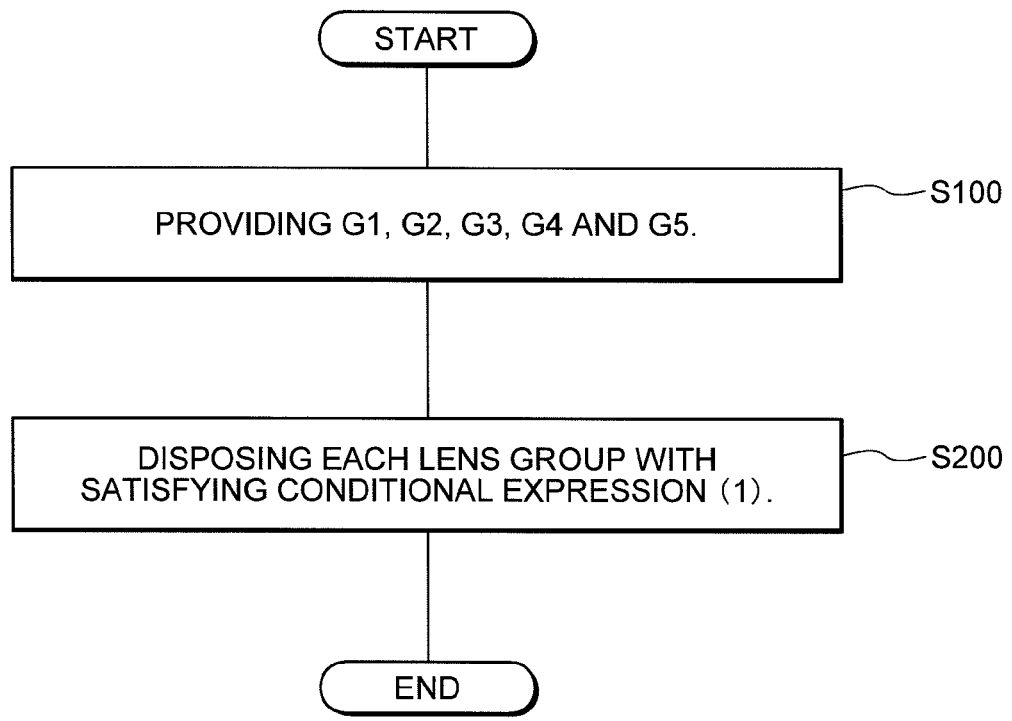
FIG. 11 is a flowchart schematically explaining a method for manufacturing the zoom optical system according to the present embodiment.

An outline of a method for manufacturing a zoom optical system ZL according to the present embodiment is explained below with reference to FIG. 11. At first, each lens group is provided by disposing each lens (Step S100). Specifically, in the present embodiment, for example, in order from an object side, a cemented lens constructed by a negative meniscus lens L11 having a concave surface facing an image side cemented with a positive meniscus lens L12 having a convex surface facing the object side, and double convex positive lens L13 are disposed as a first lens group G1. In order from the object side, a positive meniscus lens L21 having a convex surface facing the image side, a cemented lens constructed by a double concave negative lens L22 cemented with a positive meniscus lens L23 having a convex surface facing the object side, and a negative meniscus lens L24 having a concave surface facing the object side are disposed as a second lens group G2. A cemented lens constructed by, in order from the object side, a double convex positive lens L31 cemented with a negative meniscus lens L32 having a concave surface facing the object side is disposed as a third lens group G3. In order from the object side, a positive meniscus lens L41 having a convex surface facing the object side, and a cemented lens constructed by a double convex positive lens L42 cemented with a negative meniscus lens L43 having a concave surface facing the object side are disposed as a fourth lens group G4. In order from the object side, a negative meniscus lens L51 having a concave surface facing the image side, and a cemented lens constructed by a double concave negative lens L52 cemented with a positive meniscus lens L53 having a convex surface facing the object side are disposed as a fifth lens group G5. Each lens group provided in this manner is disposed to manufacture the zoom optical system ZL.

In this instance, when the focal length of the third lens group G3 is denoted by f3, and the focal length of the zoom optical system in the wide-angle end state is denoted by fw, each lens group is disposed with satisfying the above-described conditional expression (1) (step S200).

Figure 4:
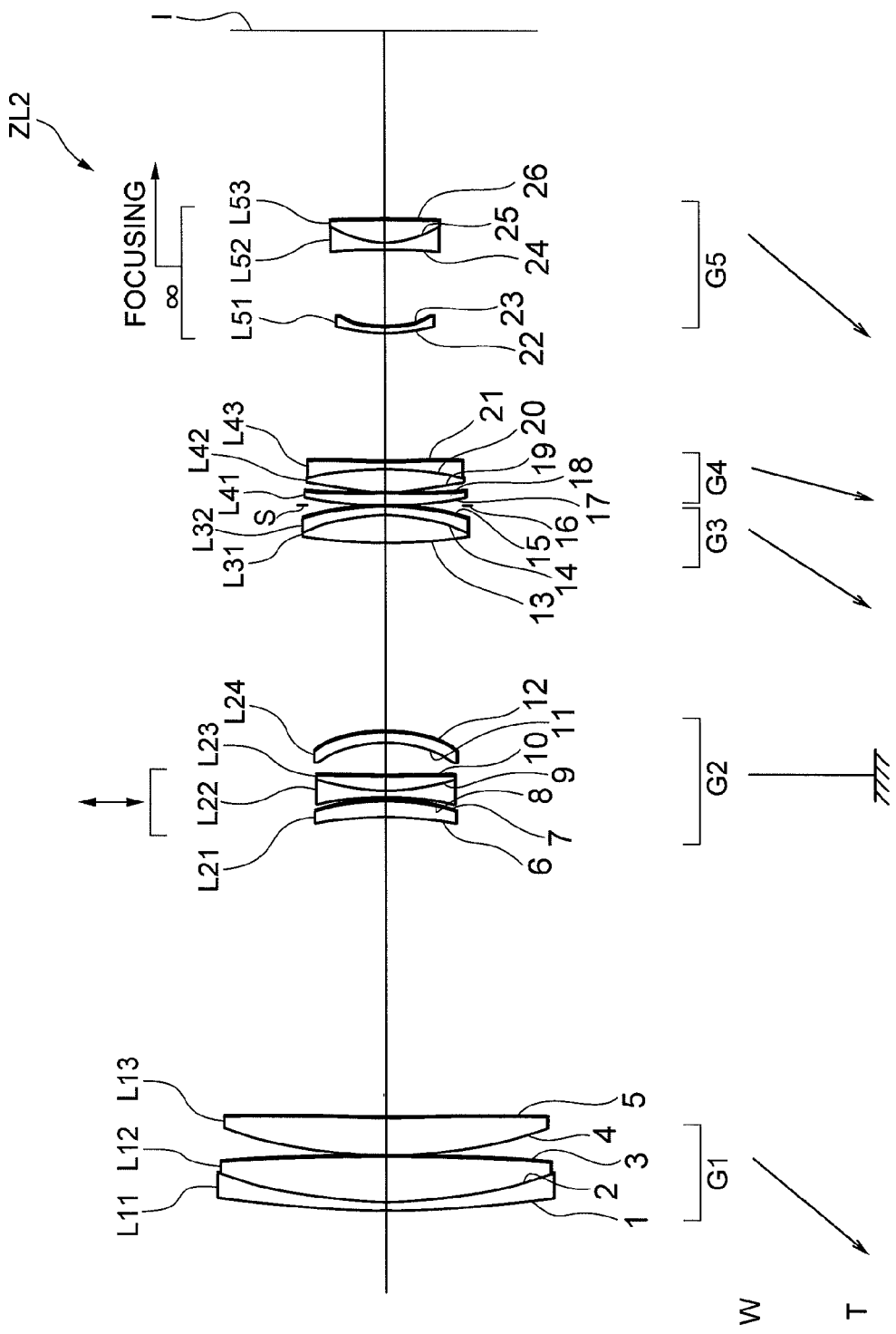
FIG. 4 is a sectional view showing a lens configuration of a zoom optical system according to Example 2.

Each Example according to the present embodiment is explained below with reference to accompanying drawings. In FIGS. 1, 4 and 7, power distribution and movement of each lens group upon zooming from the wide-angle end state W to the telephoto end state T of each of zoom optical systems ZL1, ZL2 and ZL3 are shown. As shown in FIGS. 1, 4 and 7, each of zoom lens systems ZL1, ZL2 and ZL3 according to each Example is composed of, in order from the object side, a first lens group G1 having positive refractive power, a second lens group G2 having negative refractive power, a third lens group G3 having positive refractive power, a fourth lens group G4 having positive refractive power, and a fifth lens group G5 having negative refractive power. Upon zooming from the wide-angle end state to the telephoto end state, the second lens group G2 is fixed, and the other lens groups are moved such that a distance between the first lens group G1 and the second lens group G2 increases, a distance between the second lens group G2 and the third lens group G3 decreases, a distance between the third lens group G3 and the fourth lens group G4 increases, and a distance between the fourth lens group G4 and the fifth lens group G5 decreases.

In each Example, an image blur caused by a camera shake is corrected (vibration reduction) by moving three lenses (L21, L22 and L23) disposed to the object side of the second lens group G2 in a direction including a component substantially perpendicular to the optical axis. Focusing is carried out by moving the fifth lens group G5 along the optical axis. An aperture stop S is disposed to the image side in the vicinity of the third lens group G3, and moved in a body with the third lens group G3 upon zooming.

Example 1

FIG. 1 is a sectional view showing a lens configuration of a zoom optical system ZL1 according to Example 1. In the zoom optical system ZL1 shown in FIG. 1, the first lens group G1 is composed of, in order from an object side, a cemented lens constructed by a negative meniscus lens L11 having a concave surface facing an image side cemented with a positive meniscus lens L12 having a convex surface facing the object side, and a double convex positive lens L13. The second lens group G2 is composed of, in order from the object side, a positive meniscus lens L21 having a convex surface facing the image side, a cemented lens constructed by a double concave negative lens L22 cemented with a positive meniscus lens L23 having a convex surface facing the object side, and a negative meniscus lens L24 having a concave surface facing the object side. The third lens group G3 is composed of a cemented lens constructed by, in order from the object side, a double convex positive lens L31 cemented with a negative meniscus lens L32 having a concave surface facing the object side. The fourth lens group G4 is composed of, in order from the object side, a positive meniscus lens L41 having a convex surface facing the object side, and a cemented lens constructed by a double convex positive lens L42 cemented with a negative meniscus lens L43 having a concave surface facing the object side. The fifth lens group G5 is composed of, in order from the object side, a negative meniscus lens L51 having a concave surface facing the image side, and a cemented lens constructed by a double concave negative lens L52 cemented with a positive meniscus lens L53 having a convex surface facing the object side.

Various values associated with the zoom optical system ZL1 according to Example 1 are listed in Table 1. In [Specifications], W denotes a wide-angle end state, M denotes an intermediate focal length state, T denotes a telephoto end state, f denotes a focal length of the zoom optical system, FNO denotes an f-number, and ω denotes a half angle of view (unit: degree). In [Lens Data], the left most column "i" shows the lens surface number counted in order from the object side along light propagation direction, the second column "r" shows a radius of curvature of the lens surface, the third column "d" shows a distance to the next surface, the fourth column "vd" shows an Abbe number at d-line (wavelength λ=587.6 nm), and the fifth column "nd" shows a refractive index at d-line (wavelength λ=587.6 nm). In the fifth column "nd" refractive index of the air nd=1.000000 is omitted. In the second column "r", r=0.0000 indicates a plane surface. In third column "d", Bf denotes a back focal length. In [Lens Group Data], a focal length of each lens group is shown. In [Variable Distances], variable distances and a total lens length TL with respect to each focal length state are shown. In [Values for Conditional Expressions], values for conditional expressions are shown. In respective tables for various values, "mm" is generally used for the unit of length such as the focal length, the radius of curvature and the distance to the next lens surface. However, since similar optical performance can be obtained by an optical system proportionally enlarged or reduced its dimension, the unit is not necessarily to be limited to "mm", and any other suitable unit can be used. The explanation of reference symbols is the same in the other Examples.

TABLE 1

| [Specifications] | | | |
|---|---|---|---|
| | W | M | T |
| f = | 206.00 | 295.00 | 485.00 |
| FNO = | 4.32 | 4.94 | 5.80 |
| ω = | 5.86 | 4.11 | 2.50 |

| [Lens Data] | | | | |
|---|---|---|---|---|
| i | r | d | vd | nd |
| 1 | 244.8444 | 3.0000 | 40.76 | 1.882997 |
| 2 | 120.3763 | 9.4429 | 82.51 | 1.497820 |
| 3 | 4664.1553 | 0.2000 | | |
| 4 | 138.3751 | 9.2119 | 82.51 | 1.497820 |
| 5 | −1043.5032 | (d1) | | |
| 6 | −110.9315 | 2.5157 | 35.30 | 1.592701 |
| 7 | −64.2071 | 2.0000 | | |

TABLE 1-continued

| | | | | |
|---|---|---|---|---|
| 8 | −76.2610 | 1.7000 | 40.76 | 1.882997 |
| 9 | 68.4216 | 3.2379 | 23.78 | 1.846660 |
| 10 | 937.4312 | 12.7829 | | |
| 11 | −34.6687 | 1.7000 | 64.11 | 1.516800 |
| 12 | −42.0244 | (d2) | | |
| 13 | 828.7768 | 8.8325 | 59.39 | 1.583130 |
| 14 | −48.2695 | 2.0000 | 23.78 | 1.846660 |
| 15 | −61.3129 | 0.2000 | | |
| 16 | 0.0000 | (d3) | Aperture Stop S | |
| 17 | 146.1734 | 2.4455 | 70.40 | 1.487490 |
| 18 | 325.8486 | 0.2000 | | |
| 19 | 79.1135 | 7.4196 | 82.51 | 1.497820 |
| 20 | −80.6498 | 2.0000 | 40.76 | 1.882997 |
| 21 | −280.2533 | (d4) | | |
| 22 | 52.9598 | 1.2000 | 40.76 | 1.882997 |
| 23 | 31.8370 | 23.9607 | | |
| 24 | −199.9571 | 1.2000 | 42.72 | 1.834807 |
| 25 | 26.7474 | 6.9869 | 31.27 | 1.903660 |
| 26 | 346.7584 | (Bf) | | |

[Lens Group Data]

| Group | Focal Length |
|---|---|
| G1 | 230.000 |
| G2 | −85.754 |
| G3 | 110.000 |
| G4 | 152.894 |
| G5 | −61.970 |

[Variable Distances]

| | W | M | T |
|---|---|---|---|
| d1 | 55.157 | 89.322 | 129.916 |
| d2 | 27.858 | 18.494 | 11.795 |
| d3 | 2.000 | 13.901 | 23.749 |
| d4 | 40.310 | 28.209 | 2.000 |
| Bf | 46.997 | 56.460 | 79.635 |
| TL | 274.560 | 308.622 | 349.331 |

[Values for Conditional Expressions]

(1): f3/fw = 0.534
(2): f1/fw = 1.117
(3): (−f2)/fw = 0.415
(4): f1/(−f2) = 2.688
(5): (−f5)/f3 = 0.503

Figure 2A:
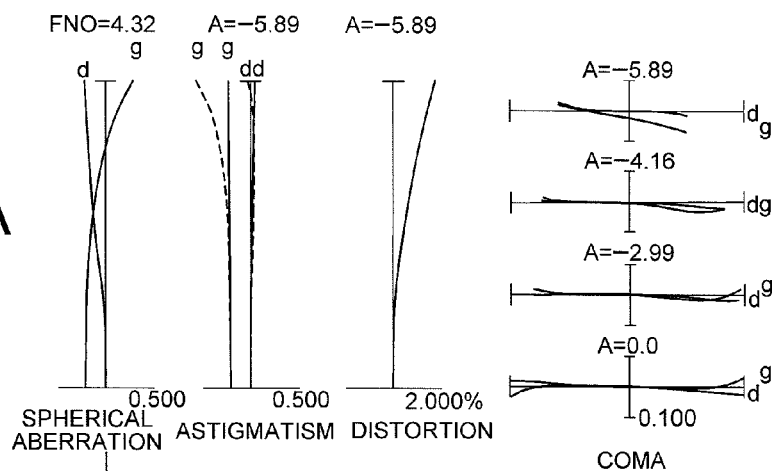
Figure 2B:
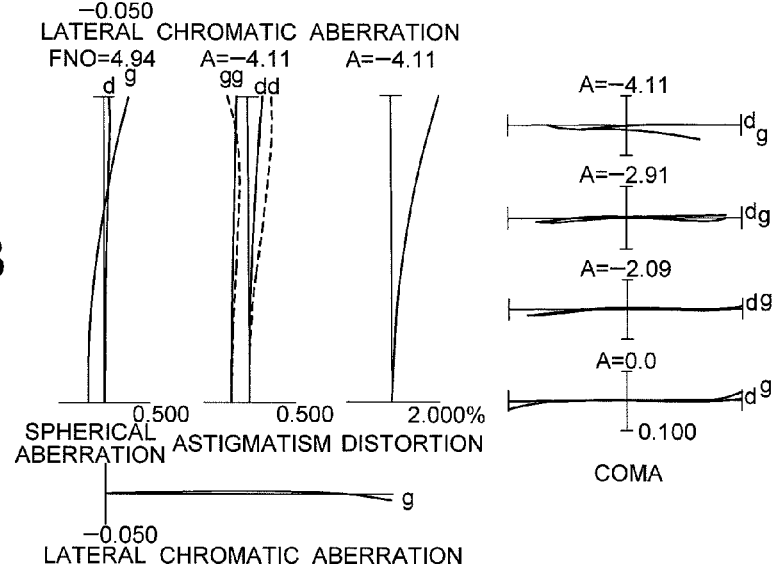
Figure 2C:
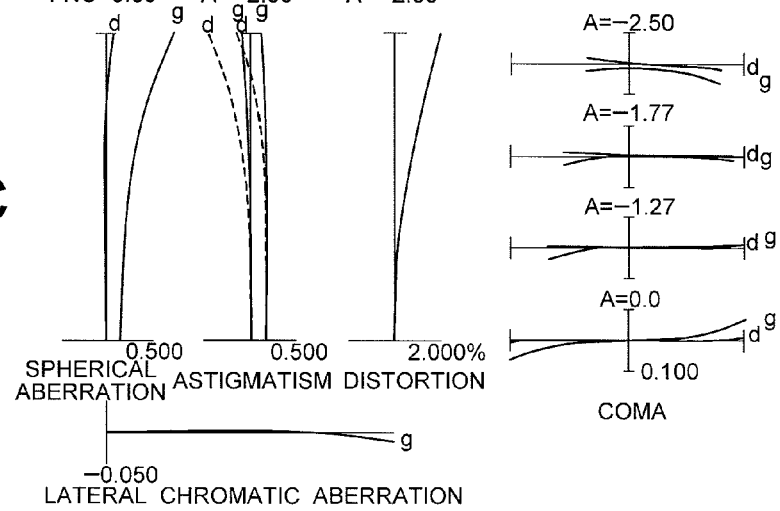
Figure 3A:
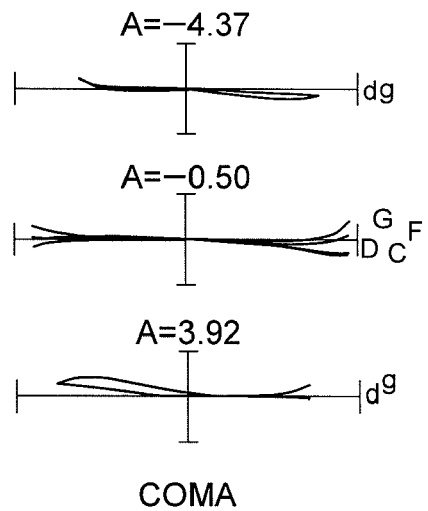
Figure 3B:
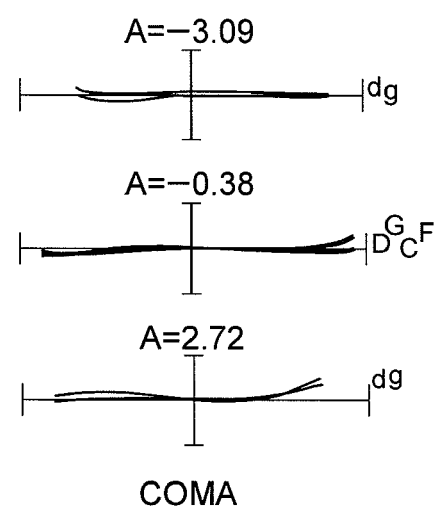
Figure 3C:
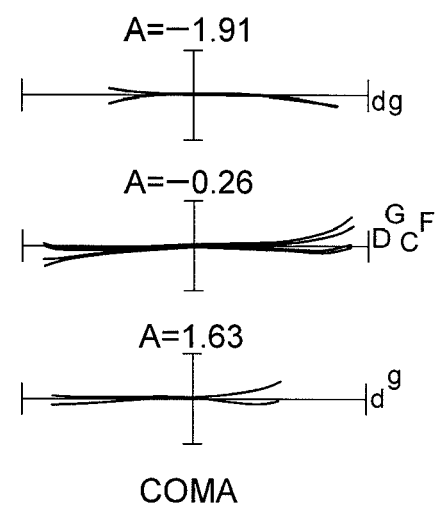

FIGS. 2A, 2B, and 2C are graphs showing various aberrations of the zoom optical system according to Example 1 focusing on infinity, in which FIG. 2A is in a wide-angle end state, FIG. 2B is in an intermediate focal length state, and FIG. 2C is in a telephoto end state. FIGS. 3A, 3B and 3C are graphs showing coma upon correcting rotational camera shake of 0.2 degrees of the zoom optical system according to Example 1, in which FIG. 3A is in the wide-angle end state, FIG. 3B is in the intermediate focal length state, and FIG. 3C is in the telephoto end state. In graphs showing astigmatism, a solid line indicates a sagittal image plane, and a broken line indicates a meridional image plane. In respective graphs, FNO denotes an f-number, A denotes a half angle of view, d denotes d-line (wavelength $\lambda$=587.6 nm), and g denotes g-line (wavelength $\lambda$=435.6 nm). As is apparent from the respective graphs, the zoom optical system ZL1 according to Example 1 shows superb optical performance as a result of good corrections to various aberrations in each focal length state from the wide-angle end state through the telephoto end state.

Example 2

FIG. 4 is a sectional view showing a lens configuration of a zoom optical system ZL2 according to Example 2. In the zoom optical system ZL2 shown in FIG. 4, a first lens group G1 is composed of, in order from an object side, a cemented lens constructed by a negative meniscus lens L11 having a concave surface facing an image side cemented with a double convex positive lens L12, and a double convex positive lens L13. A second lens group G2 is composed of, in order from the object side, a positive meniscus lens L21 having a convex surface facing the image side, a cemented lens constructed by a double concave negative lens L22 cemented with a positive meniscus lens L23 having a convex surface facing the object side, and a negative meniscus lens L24 having a concave surface facing the object side. A third lens group G3 is composed of a cemented lens constructed by, in order from the object side, a double convex positive lens L31 cemented with a negative meniscus lens L32 having a concave surface facing the object side. A fourth lens group G4 is composed of, in order from the object side, a positive meniscus lens L41 having a convex surface facing the object side, and a cemented lens constructed by a double convex positive lens L42 cemented with a negative meniscus lens L43 having a concave surface facing the object side. A fifth lens group G5 is composed of, in order from the object side, a negative meniscus lens L51 having a concave surface facing the image side, and a cemented lens constructed by a double concave negative lens L52 cemented with a positive meniscus lens L53 having a convex surface facing the object side.

Various values associated with the zoom optical system ZL2 according to Example 2 are listed in Table 2.

TABLE 2

[Specifications]

|  | W | M | T |
|---|---|---|---|
| f = | 203.00 | 305.00 | 485.00 |
| FNO = | 3.92 | 4.88 | 5.79 |
| ω = | 5.95 | 3.97 | 2.50 |

[Lens Data]

| i | r | d | νd | nd |
|---|---|---|---|---|
| 1 | 347.4248 | 2.2000 | 40.76 | 1.882997 |
| 2 | 146.0225 | 11.4567 | 82.51 | 1.497820 |
| 3 | −562.8397 | 0.2000 | | |
| 4 | 143.3073 | 9.4340 | 82.51 | 1.497820 |
| 5. | −5914.9730 | (d1) | | |
| 6 | −103.3794 | 3.8878 | 35.30 | 1.592701 |
| 7 | −64.4995 | 1.0000 | | |
| 8 | −84.9358 | 1.5000 | 40.76 | 1.882997 |
| 9 | 61.7704 | 3.6004 | 25.68 | 1.784723 |
| 10 | 2004.3015 | 8.6533 | | |
| 11 | −34.6015 | 2.6259 | 64.11 | 1.516800 |
| 12 | −39.7969 | (d2) | | |
| 13 | 169.6277 | 7.0348 | 48.08 | 1.699998 |
| 14 | −54.3130 | 2.0000 | 23.06 | 1.860740 |
| 15 | −86.0482 | 0.2000 | | |
| 16 | 0.0000 | (d3) | Aperture Stop S | |
| 17 | 125.8628 | 2.9436 | 82.51 | 1.497820 |
| 18 | 962.3746 | 0.2000 | | |
| 19 | 82.9966 | 5.6727 | 70.40 | 1.487490 |
| 20 | −102.7506 | 2.0000 | 40.76 | 1.882997 |
| 21 | 1126.4921 | (d4) | | |
| 22 | 61.9956 | 1.2000 | 40.76 | 1.882997 |
| 23 | 32.1728 | 19.0123 | | |
| 24 | −153.3232 | 1.5000 | 44.17 | 1.785900 |
| 25 | 27.2143 | 5.4404 | 32.35 | 1.850260 |
| 26 | 2940.9598 | (Bf) | | |

[Lens Group Data]

| Group | Focal Length |
|---|---|
| G1 | 230.361 |
| G2 | −94.950 |
| G3 | 90.606 |
| G4 | 206.593 |
| G5 | −59.855 |

[Variable Distances]

|  | W | M | T |
|---|---|---|---|
| d1 | 74.455 | 96.231 | 131.721 |
| d2 | 46.821 | 27.971 | 14.938 |
| d3 | 0.200 | 6.672 | 13.126 |
| d4 | 32.182 | 20.741 | 0.200 |
| Bf | 46.632 | 70.473 | 97.562 |
| TL | 292.052 | 313.850 | 348.310 |

[Values for Conditional Expressions]

(1): f3/fw = 0.446
(2): f1/fw = 1.135
(3): (−f2)/fw = 0.468
(4): f1/(−f2) = 2.426
(5): (−f5)/f3 = 0.662

Figure 5A:
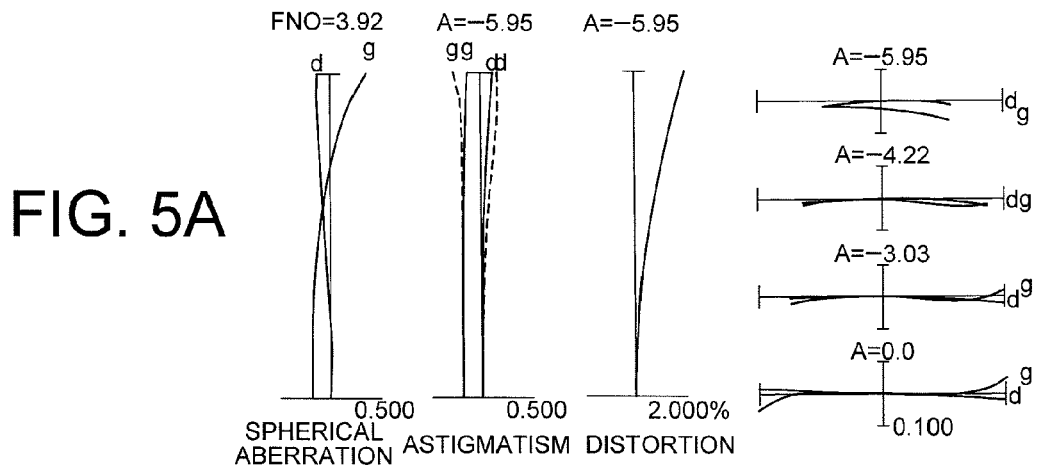
Figure 5B:
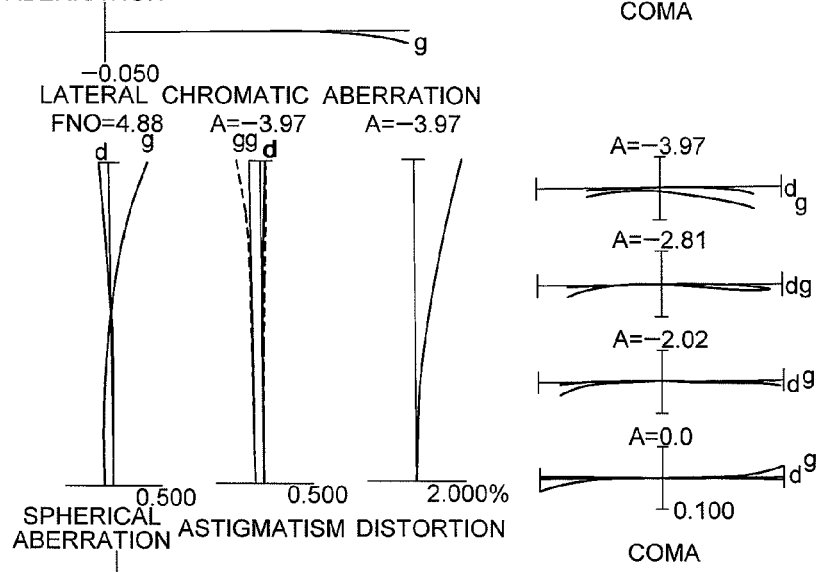
Figure 5C:
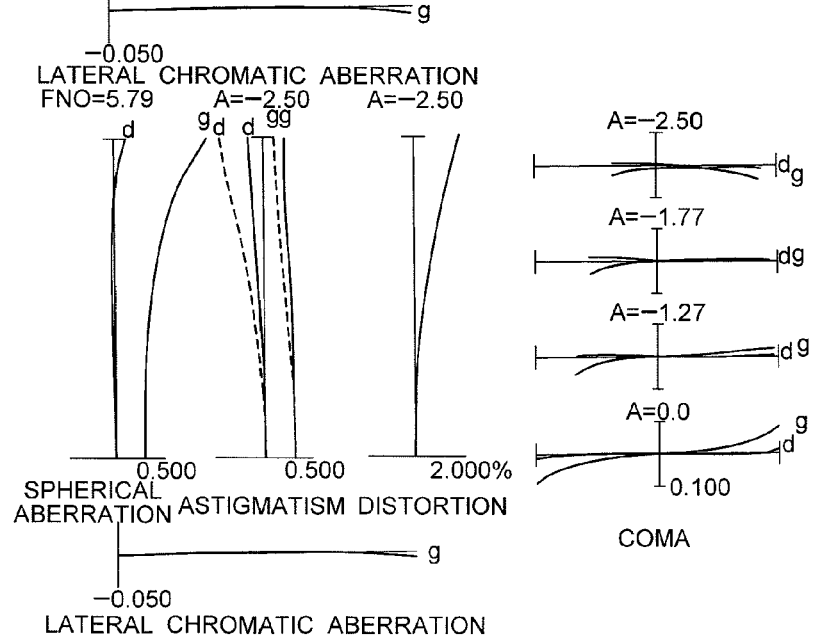
Figure 6A:
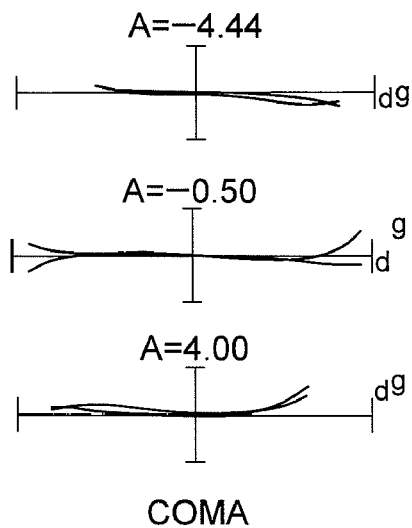
Figure 6B:
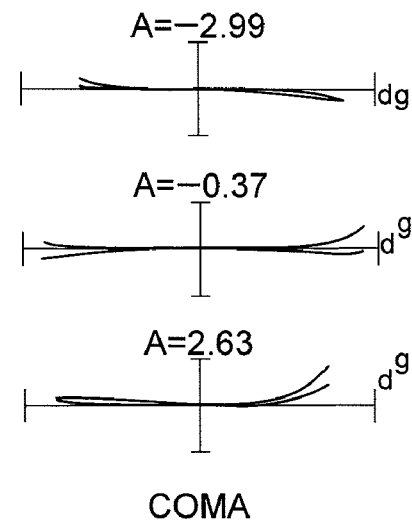
Figure 6C:
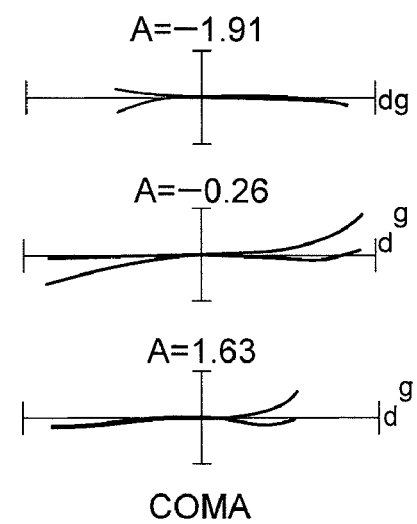

FIGS. 5A, 5B, and 5C are graphs showing various aberrations of the zoom optical system according to Example 2 focusing on infinity, in which FIG. 5A is in a wide-angle end state, FIG. 5B is in an intermediate focal length state, and FIG. 5C is in a telephoto end state. FIGS. 6A, 6B and 6C are graphs showing coma upon correcting rotational camera shake of 0.2 degrees of the zoom optical system according to Example 2, in which FIG. 6A is in the wide-angle end state, FIG. 6B is in the intermediate focal length state, and FIG. 6C is in the telephoto end state. As is apparent from the respective graphs, the zoom optical system ZL2 according to Example 2 shows superb optical performance as a result of good corrections to various aberrations in each focal length state from the wide-angle end state through the telephoto end state.

Example 3

FIG. 7 is a sectional view showing a lens configuration of a zoom optical system ZL3 according to Example 3. In the zoom optical system ZL3 shown in FIG. 7, a first lens group G1 is composed of, in order from an object side, a cemented lens constructed by a negative meniscus lens L11 having a concave surface facing an image side cemented with a positive meniscus lens L12 having a convex surface facing the object side, and a double convex positive lens L13. A second lens group G2 is composed of, in order from the object side, a positive meniscus lens L21 having a convex surface facing the image side, a cemented lens constructed by a positive meniscus lens L22 having a convex surface facing the image side cemented with a double concave negative lens L23, and a cemented lens constructed by a double concave negative lens L24 cemented with a double convex positive lens L25. A third lens group G3 is composed of, in order from the object side, a double convex positive lens L31, and a cemented lens constructed by a double convex positive lens L32 cemented with a double concave negative lens L33. A fourth lens group G4 is composed of, in order from the object side, a double convex positive lens L41, and a cemented lens constructed by a double convex positive lens L42 cemented with a negative meniscus lens L43 having a concave surface facing the object side. A fifth lens group G5 is composed of, in order from the object side, a negative meniscus lens L51 having a concave surface facing the image side, and a cemented lens constructed by a double concave negative lens L52 cemented with a positive meniscus lens L53 having a convex surface facing the object side.

Various values associated with the zoom optical system ZL3 according to Example 3 are listed in Table 3.

TABLE 3

| [Specifications] | | | |
| --- | --- | --- | --- |
| | W | M | T |
| f = | 206.00 | 305.00 | 485.00 |
| FNO = | 3.92 | 4.51 | 5.92 |
| ω = | 5.92 | 4.00 | 2.50 |

| [Lens Data] | | | | |
| --- | --- | --- | --- | --- |
| i | r | d | νd | nd |
| 1 | 206.4295 | 2.2000 | 40.76 | 1.882997 |
| 2 | 118.8362 | 9.2593 | 82.51 | 1.497820 |
| 3 | 736.0691 | 0.2000 | | |
| 4 | 125.9346 | 10.4209 | 91.21 | 1.456000 |
| 5 | −2048.5213 | (d1) | | |
| 6 | −271.5836 | 2.0000 | 30.13 | 1.698947 |
| 7 | −138.1248 | 4.0000 | | |
| 8 | −635.5274 | 2.1397 | 39.22 | 1.595510 |
| 9 | −134.8098 | 1.5000 | 40.76 | 1.882997 |
| 10 | 194.2742 | 5.2488 | | |
| 11 | −59.4210 | 1.5000 | 40.76 | 1.882997 |
| 12 | 134.2058 | 4.0091 | 23.78 | 1.846660 |
| 13 | −123.7939 | (d2) | | |
| 14 | 119.9455 | 8.0000 | 44.79 | 1.743997 |
| 15 | −166.0361 | 1.1752 | | |
| 16 | 62.3217 | 6.0710 | 47.93 | 1.717004 |
| 17 | −263.5052 | 1.5018 | 31.27 | 1.903660 |
| 18 | 59.7305 | 6.4358 | | |
| 19 | 0.0000 | (d3) | Aperture Stop S | |
| 20 | 138.8635 | 3.0034 | 50.89 | 1.658441 |
| 21 | −385.4491 | 0.2000 | | |
| 22 | 70.5560 | 5.4227 | 64.11 | 1.516800 |
| 23 | −101.2001 | 1.5000 | 31.27 | 1.903660 |
| 24 | −1083.1653 | (d4) | | |
| 25 | 47.5908 | 1.6000 | 40.76 | 1.882997 |
| 26 | 29.1167 | 22.1429 | | |
| 27 | −141.7167 | 2.2825 | 44.17 | 1.785900 |
| 28 | 27.8192 | 8.0000 | 31.27 | 1.903660 |
| 29 | 419.8714 | (Bf) | | |

| [Lens Group Data] | |
| --- | --- |
| Group | Focal Length |
| G1 | 239.430 |
| G2 | −76.466 |
| G3 | 127.225 |

TABLE 3-continued

| | | |
|---|---|---|
| G4 | | 92.011 |
| G5 | | −63.945 |

[Variable Distances]

| | W | M | T |
|---|---|---|---|
| d1 | 69.017 | 99.752 | 124.910 |
| d2 | 38.601 | 28.096 | 0.400 |
| d3 | 2.000 | 5.986 | 48.891 |
| d4 | 26.981 | 17.610 | 2.000 |
| Bf | 47.013 | 62.700 | 63.199 |
| TL | 293.425 | 323.958 | 349.213 |

[Values for Conditional Expressions]

(1): f3/fw = 0.618
(2): f1/fw = 1.162
(3): (−f2)/fw = 0.371
(4): f1/(−f2) = 3.131
(5): (−f5)/f3 = 0.503

Figure 8A:
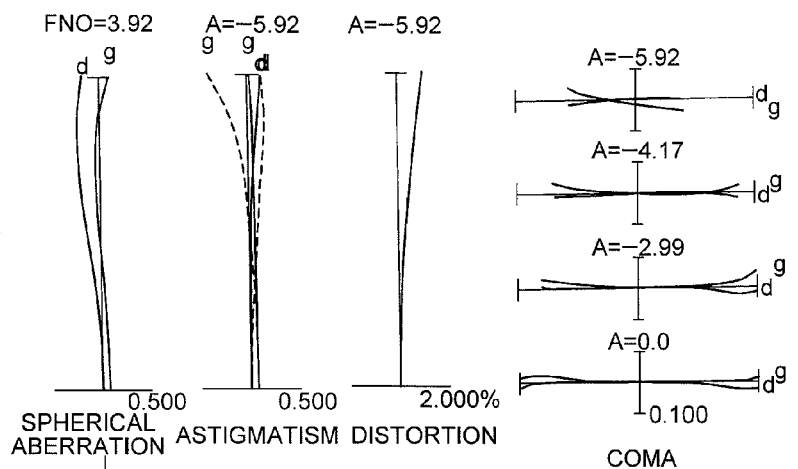
Figure 8B:
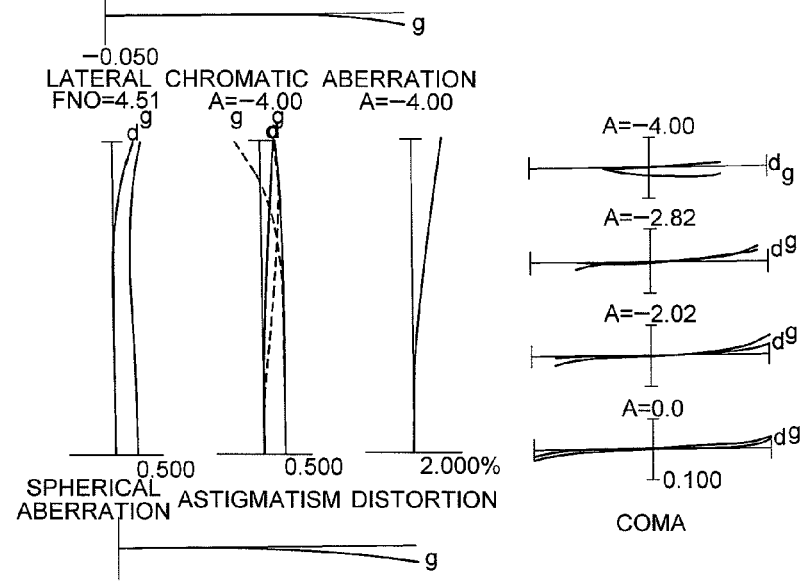
Figure 8C:
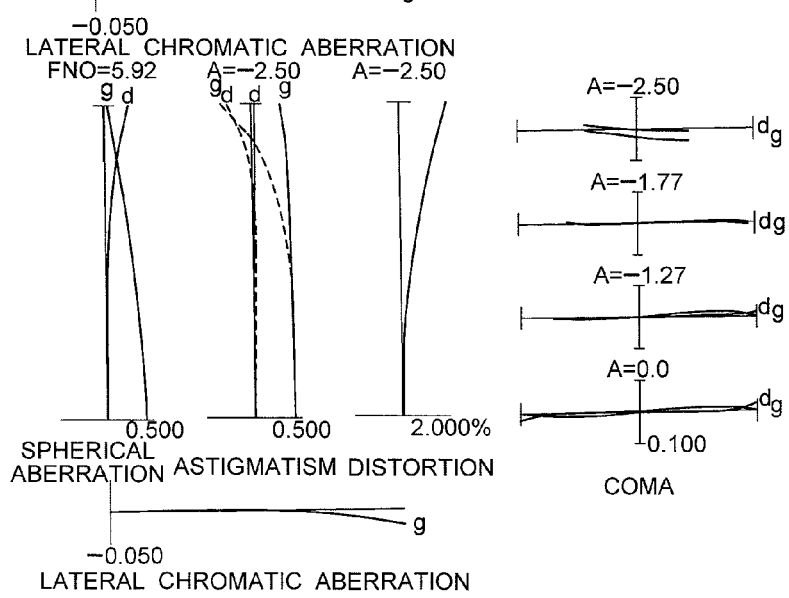
Figure 9A:
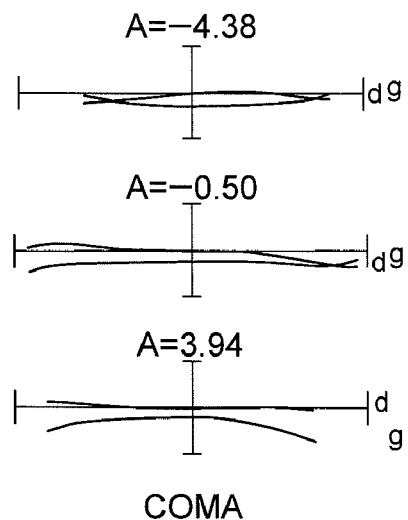
Figure 9B:
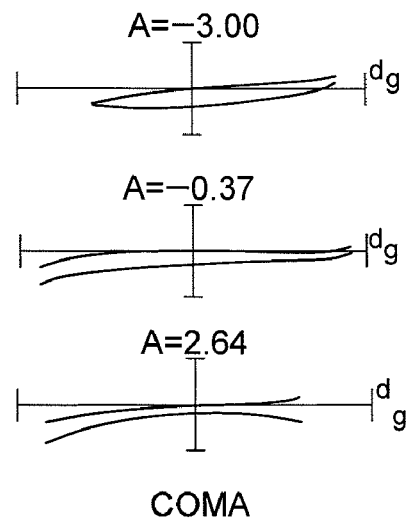
Figure 9C:
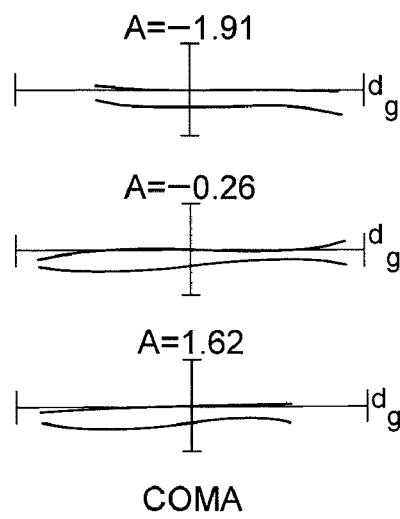

FIGS. 8A, 8B and 8C are graphs showing various aberrations of the zoom optical system according to Example 3 focusing on infinity, in which FIG. 8A is in a wide-angle end state, FIG. 8B is in an intermediate focal length state, and FIG. 8C is in a telephoto end state. FIGS. 9A, 9B and 9C are graphs showing coma upon correcting rotational camera shake of 0.2 degrees of the zoom optical system according to Example 3, in which FIG. 9A is in the wide-angle end state, FIG. 9B is in the intermediate focal length state, and FIG. 9C is in the telephoto end state. As is apparent from the respective graphs, the zoom optical system ZL3 according to Example 3 shows superb optical performance as a result of good corrections to various aberrations in each focal length state from the wide-angle end state through the telephoto end state.

Incidentally, the following description may suitably be applied within limits that do not deteriorate optical performance.

In the above described explanations and Examples, although zoom optical systems having a five-lens-group configuration has been shown, the above described lens configuration can be applied to other lens configurations such as a six-lens-group configuration and a seven-lens-group configuration. Moreover, a lens configuration in which a lens or a lens group is added to the most object side, and a lens configuration in which a lens or a lens group is added to the most image side may be possible. Incidentally, a lens group is defined as a portion having at least one lens that is separated by air spaces that varies upon zooming from the other portions.

Moreover, any lens surface may be formed as a spherical surface, a plane surface or an aspherical surface. When a lens surface is a spherical surface or a plane surface, processing and assembling become easy, so that deterioration of optical performance caused by errors upon processing and assembling can be prevented. Even if the image plane is shifted, deterioration in optical performance is small, so that it is desirable. When the lens surface is an aspherical surface, the aspherical surface may be fabricated by a fine grinding process, a glass molding process that a glass material is formed into an aspherical shape by a mold, or a compound type process that a resin material is formed into an aspherical shape on a glass surface. Any lens surface may be a diffractive optical surface. Any lens may be a graded index lens (GRIN lens), or a plastic lens.

Although an aperture stop S is preferably disposed in the vicinity of the third lens group G3, the function may be substituted by a lens frame without disposing a member as an aperture stop.

An antireflection coating having high transmittance over a broad wavelength range may be applied to each lens surface to reduce flare or ghost images, so that high optical performance with a high contrast can be attained.

The present embodiment only shows a specific example for the purpose of better understanding of the present application. Accordingly, it is needless to say that the application in its broader aspect is not limited to the specific details and representative devices.

What is claimed is:

1. A zoom optical system comprising, in order from an object side:
   a first lens group having positive refractive power;
   a second lens group having negative refractive power;
   a third lens group having positive refractive power;
   a fourth lens group having positive refractive power; and
   a fifth lens group having negative refractive power; and
   the following conditional expression being satisfied:

$$0.20 < f3/fw < 0.70$$

where f3 denotes a focal length of the third lens group, and fw denotes a focal length of the zoom optical system in a wide-angle end state.

2. The zoom optical system according to claim 1, wherein the second lens group is fixed upon zooming from the wide-angle end state to a telephoto end state.

3. The zoom optical system according to claim 1, wherein at least a portion of the second lens group is movable in a direction including a component substantially perpendicular to an optical axis.

4. The zoom optical system according to claim 1, wherein the following conditional expression is satisfied:

$$1.00 < f1/fw < 1.43$$

where f1 denotes a focal length of the first lens group.

5. The zoom optical system according to claim 1, wherein the following conditional expression is satisfied:

$$0.20 < (-f2)/fw < 0.50$$

where f2 denotes a focal length of the second lens group.

6. The zoom optical system according to claim 1, wherein at least a portion of the fifth lens group is movable along an optical axis upon focusing.

7. The zoom optical system according to claim 1, wherein the following conditional expression is satisfied:

$$2.10 < f1/(-f2) < 3.50$$

where f1 denotes a focal length of the first lens group, f2 denotes a focal length of the second lens group.

8. The zoom optical system according to claim 1, wherein the following conditional expression is satisfied:

$$0.40<(-f5)/f3<0.70$$

where f5 denotes a focal length of the fifth lens group.

9. The zoom optical system according to claim 1, wherein the second lens group includes, in order from the object side, a positive meniscus lens having a convex surface facing an image side, and a cemented lens.

10. The zoom optical system according to claim 1, wherein the fifth lens group includes, in order from the object side, a negative meniscus lens having a concave surface facing an image side, and a cemented lens.

11. The zoom optical system according to claim 1, wherein an aperture stop is disposed to an image side of the third lens group.

12. The zoom optical system according to claim 1, wherein an aperture stop is moved in a body with the third lens group upon zooming.

13. An optical apparatus equipped with the zoom optical system according to claim 1.

14. A method for manufacturing a zoom optical system including a first lens group having positive refractive power, a second lens group having negative refractive power, a third lens group having positive refractive power, a fourth lens group having positive refractive power, and a fifth lens group having negative refractive power, the method comprising steps of:
  providing the first lens group, the second lens group, the third lens group, the fourth lens group, and the fifth lens group; and
  disposing each lens group with satisfying the following conditional expression:

$$0.20<f3/fw<0.70$$

where f3 denotes a focal length of the third lens group, and fw denotes a focal length of the zoom optical system in a wide-angle end state.

15. The method according to claim 14, further comprising a step of:
  fixing the second lens group upon zooming from the wide-angle end state to a telephoto end state.

16. The method according to claim 14, further comprising a step of:
  disposing at least a portion of the second lens group movable in a direction including a component substantially perpendicular to an optical axis.

17. The method according to claim 14, further comprising a step of:
  disposing each lens group with satisfying the following conditional expression:

$$1.00<f1/fw<1.43$$

where f1 denotes a focal length of the first lens group.

18. The method according to claim 14, further comprising a step of:
  disposing each lens group with satisfying the following conditional expression:

$$0.20<(-f2)/fw<0.50$$

where f2 denotes a focal length of the second lens group.

* * * * *